(12) United States Patent
Griess

(10) Patent No.: US 7,844,584 B1
(45) Date of Patent: Nov. 30, 2010

(54) SYSTEM AND METHOD FOR PERSISTENTLY STORING LOCK STATE INFORMATION

(75) Inventor: Peter Griess, San Francisco, CA (US)

(73) Assignee: NetApp, Inc., Sunnyvale, CA (US)

( * ) Notice: Subject to any disclaimer, the term of this patent is extended or adjusted under 35 U.S.C. 154(b) by 296 days.

(21) Appl. No.: 11/473,888

(22) Filed: Jun. 23, 2006

(51) Int. Cl.
G06F 17/00 (2006.01)

(52) U.S. Cl. ............... 707/704; 707/687; 707/694; 707/668; 709/210

(58) Field of Classification Search ........ 707/704, 707/668, 687, 694; 709/210
See application file for complete search history.

(56) References Cited

U.S. PATENT DOCUMENTS

| | | | |
|---|---|---|---|
| 5,666,532 A * | 9/1997 | Saks et al. ........... | 707/205 |
| 5,819,292 A | 10/1998 | Hitz et al. | |
| 5,948,110 A | 9/1999 | Hitz et al. | |
| 5,950,225 A | 9/1999 | Kleiman | |
| 5,963,962 A | 10/1999 | Hitz et al. | |
| 5,987,506 A * | 11/1999 | Carter et al. ........ | 709/213 |
| 6,021,508 A * | 2/2000 | Schmuck et al. ...... | 714/4 |
| 6,032,216 A * | 2/2000 | Schmuck et al. ..... | 710/200 |
| 6,038,570 A | 3/2000 | Hitz et al. | |
| 6,138,126 A | 10/2000 | Hitz et al. | |
| 6,199,244 B1 | 3/2001 | Hilgers et al. | |
| 7,249,150 B1 | 7/2007 | Watanabe et al. | |
| 7,293,203 B1 | 11/2007 | Coatney et al. | |
| 7,376,866 B1 | 5/2008 | Sarma | |
| 7,426,617 B2 | 9/2008 | Stager | |
| 7,430,571 B2 | 9/2008 | Edwards | |
| 7,519,628 B1 | 4/2009 | Leverett | |

OTHER PUBLICATIONS

U.S. Appl. No. 60/272,782, entitled a System and Method for Asynchronous Replication for Storage Area Networks; filed Mar. 5, 2001 by Yoram Novick.

* cited by examiner

*Primary Examiner*—Wilson Lee
*Assistant Examiner*—Tuan-Khanh Phan
(74) *Attorney, Agent, or Firm*—Cesari and McKenna, LLP

(57) ABSTRACT

A system and method persistently stores lock state information associated with a file system within a storage system. Received operations that modify lock state information are stored in a non-volatile log (NVLog) within a non-volatile random access memory (NVRAM) of the storage system. During a consistency point (CP), entries from the NVLog are committed to a lock file. In the event of an error condition, lock state information may be recovered from the lock file, thereby enabling rapid reconstruction of the lock state prior to the error condition.

20 Claims, 13 Drawing Sheets

SYSTEM AND METHOD FOR PERSISTENTLY STORING LOCK STATE INFORMATION

FIELD OF THE INVENTION

The present invention relates to file systems and, more particularly, to persistently storing lock state information in a file system.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL®) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

Most file-level protocols include locking functionality that enables a client to transmit an operation to a software module that acts in conjunction with a file system to implement a lock on either an entire file or a defined subset of a file. Once the lock is granted, only the client owning the lock may perform certain operations (e.g., write operations) directed to the file or subset thereof. Other clients attempting such operations will have these operations denied by the file system. Typically, the file system maintains the current lock state in the memory of the storage system, i.e., in core. That is, if a client acquires a lock, information concerning the lock is typically retained in an in-memory data construct that may be quickly accessed by the file system when determining whether to permit/deny subsequently later requested operations. A noted disadvantage of such a typical implementation arises in the event of a failure of the storage system. If, for example, the storage system suffers an error condition and reinitializes (reboots), all lock state information maintained by the storage system is lost. This forces all clients of the storage system to re-obtain all previously held locks. Should a first client be unsuccessful in re-obtaining a given lock, a second client may write data and/or perform operations to the file in a manner that interferes with potentially partially completed operations initiated by the first client having the original lock. Depending on the types of operations received and the types of operations that were in progress, data corruption and/or data inconsistency may result from the second client's operations. A further noted disadvantage of conventional lock recovery techniques is that the servers must disallow new lock requests for some period of time, which is typically on the order of minutes. During this time period, further disruption of client services is caused by clients being unable to obtain new locks, which may cause timeouts, etc.

Additionally, in environments that support a clustered storage system wherein one "surviving" storage system is capable of "assuming the identity" of a failed storage system, another noted disadvantage is that clients must reestablish locks on the surviving storage system after a failover operation. This reduces the transparency of failover operations and again increases the likelihood of data corruption and/or data inconsistency.

SUMMARY OF THE INVENTION

The present invention overcomes the disadvantages of the prior art by providing a system and method for persistently storing lock state information of a file system within a storage system. To that end, a storage operating system executing on a storage system generates entries identifying the lock state information within a non-volatile log (NVLog) that is illustratively stored on a non-volatile random access memory (NVRAM) of the storage system.

At regular intervals, the entries within the NVLog are flushed (written) to a lock file stored on persistent storage devices, such as disks, coupled to the storage system. Illustratively, the lock state information entries are written to the lock file so that any storage system capable of accessing the storage devices may obtain the lock state information. Persistent storage of the lock state information obviates the need for clients to reestablish locks after an error condition as the storage system may, during a reinitialization process, determine the lock state of the file system as of the time of the error condition. Additionally, lock state information and its associated data may be migrated to other storage systems by transferring the lock file in accordance with, e.g., a migration operation. Similarly, the lock state information may be propagated via conventional mirroring techniques by including the lock file within a mirrored file system.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
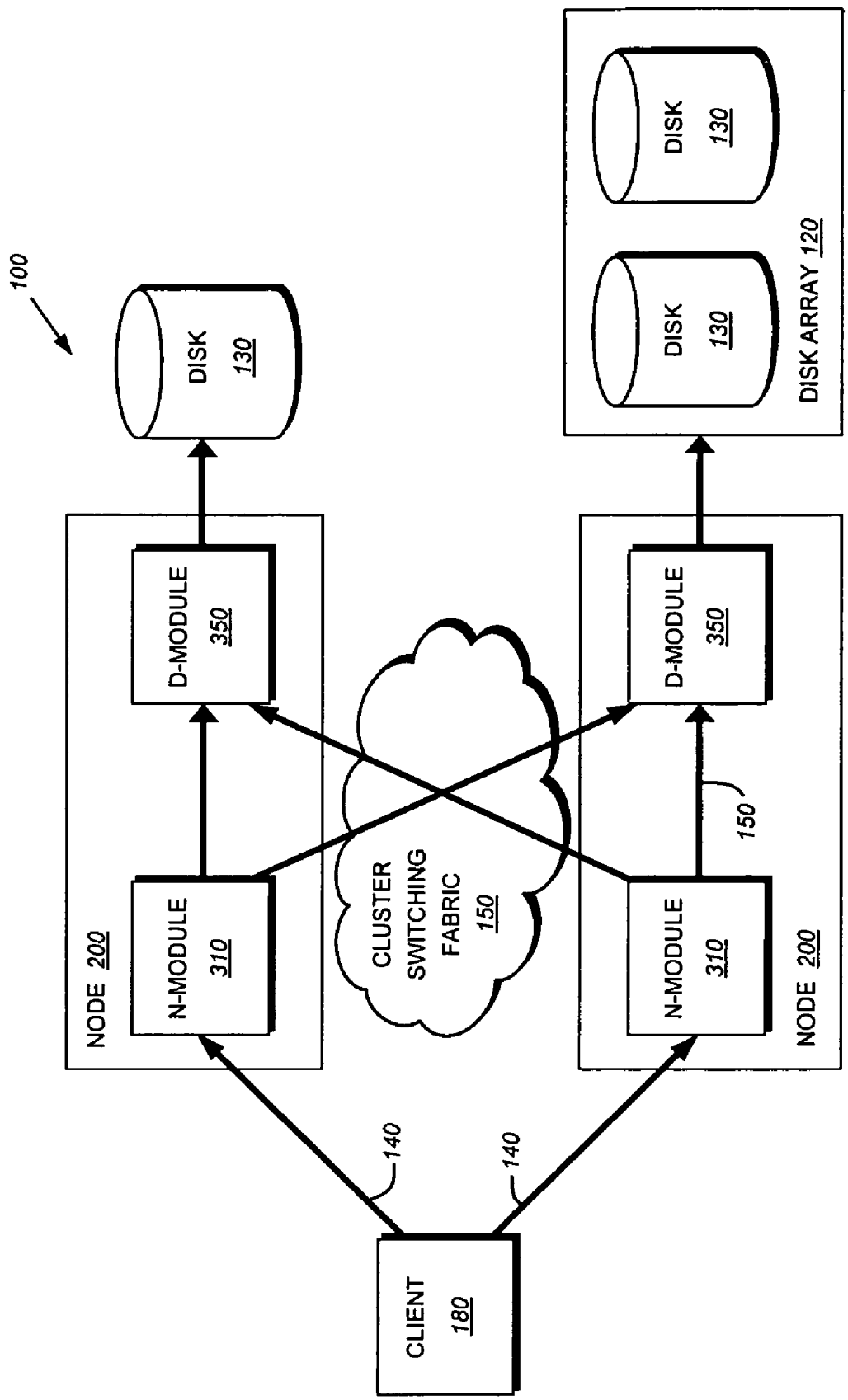
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar, et al. published on Aug. 22, 2002. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
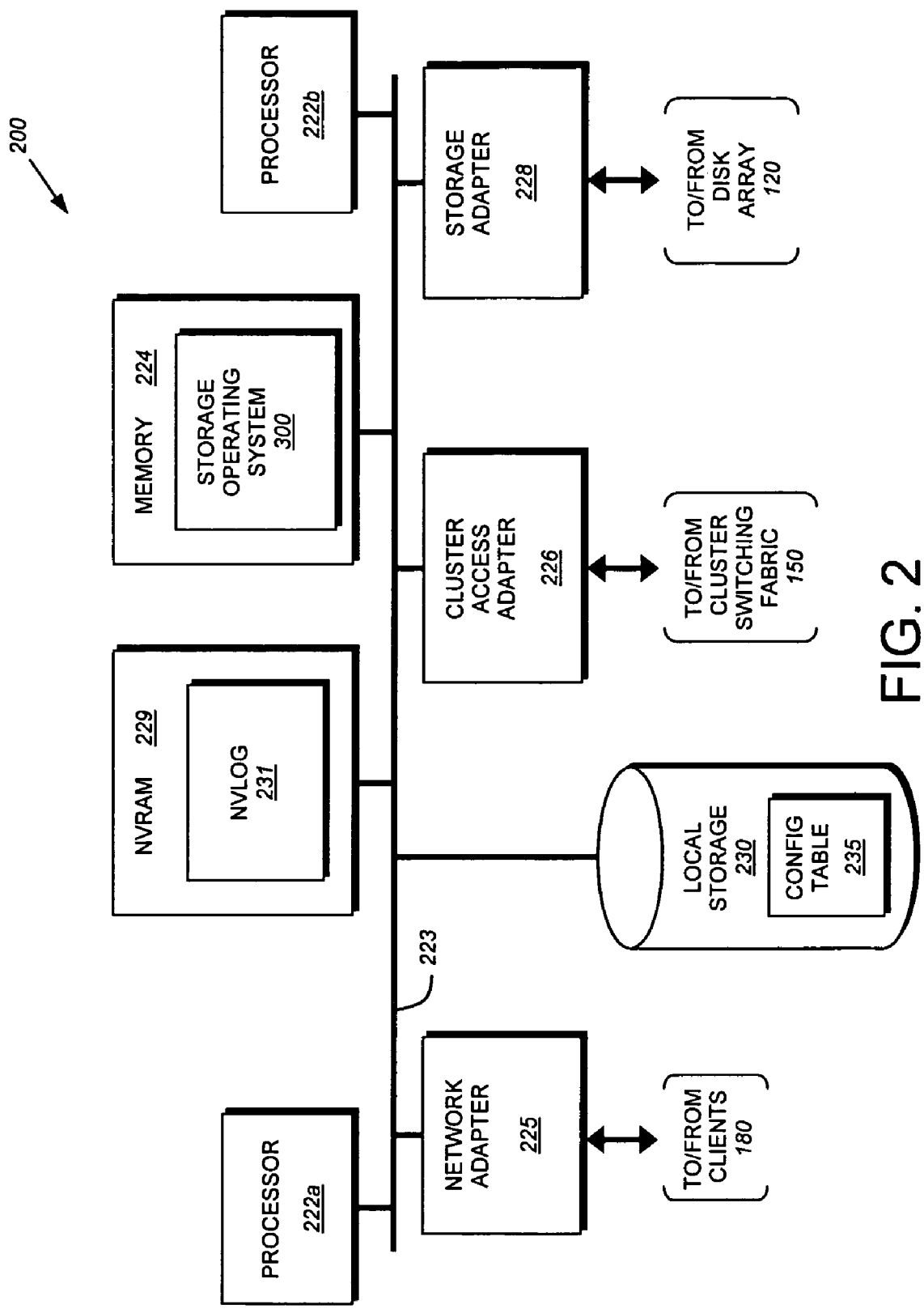
FIG. 2 is a schematic block diagram of a node in accordance with an embodiment of the present invention.

FIG. 2 is a schematic block diagram of a node 200 that is illustratively embodied as a storage system comprising a plurality of processors 222a,b, a memory 224, a network adapter 225, a cluster access adapter 226, a storage adapter 228 a non-volatile random access memory (NVRAM) 229 and local storage 230 interconnected by a system bus 223. The local storage 230 comprises one or more storage devices, such as disks, utilized by the node to locally store configuration information (e.g., in configuration table 235) provided by one or more management processes that execute as user mode applications 1100 (see FIG. 11). The cluster access adapter 226 comprises a plurality of ports to adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222*a* executes the functions of the N-module 310 on the node, while the other processor 222*b* executes the functions of the D-module 350.

The memory 224 illustratively comprises storage locations that are addressable by the processors and adapters for storing software program code and data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, microelectro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

The NVRAM 229 illustratively comprises a battery-backed memory that remains persistent through power cycles and/or error conditions of the node 200. However, in alternate embodiments, the NVRAM 229 may comprise any suitable storage medium that is persistent across power cycles of the node 200. In accordance with the illustrative embodiment, the storage operating system 300 constructs a non-volatile log (NVLog) 231 within the NVRAM 229. File system operations are stored in entries of the NVLog 231 until a consistency point (CP), at which time the entries are flushed (written) to disk 130. A CP may arise due to, e.g., the NVLog 231 exceeding a predetermined capacity, expiration of a timer, invocation of an administrative command, etc. In response to occurrence of an error condition occur, the NVLog 231 may be replayed upon reinitialization to render the on-disk file system consistent with the state of the file system at the time of the error condition.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 illustratively implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP® operating system available from Network Appliance, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

Figure 3:
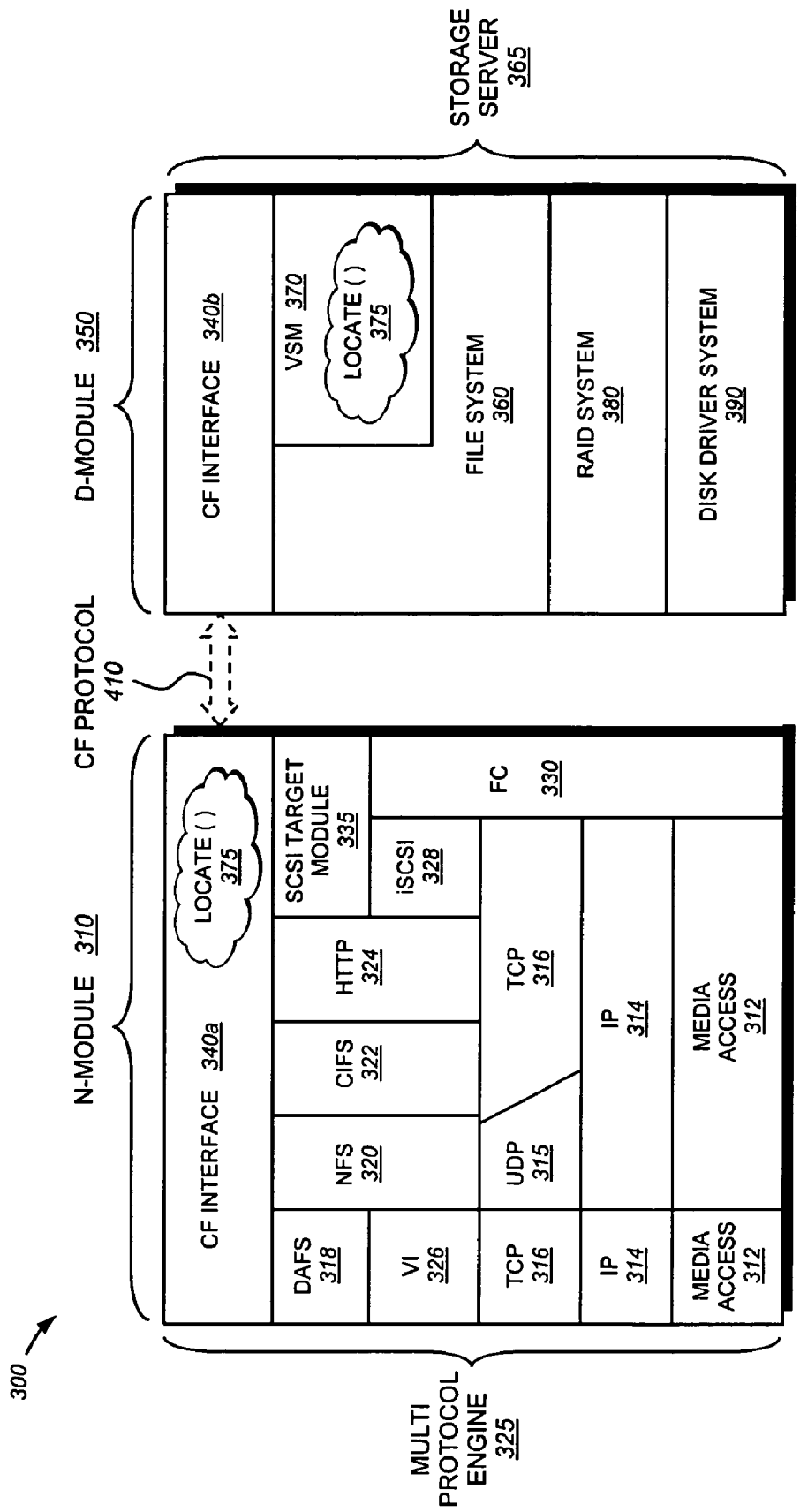
FIG. 3 is a schematic block diagram of a storage operating system that may be advantageously used with the present invention.

FIG. 3 is a schematic block diagram of the storage operating system 300 that may be advantageously used with the present invention. The storage operating system 300 comprises a series of software layers organized to form an integrated network protocol stack or, more generally, a multi-protocol engine 325 that provides data paths for clients is to access information stored on the node using block and file access protocols. The multi-protocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system 300 includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. In particular, the VSM 370 implements a Locate( ) function 375 to compute the location of data container content among the volumes served by the cluster to thereby ensure consistency of such content.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 1110 (see FIG. 11), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (KB) blocks and using index nodes ("inodes") to identify files and file attributes (such as creation time, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it on to a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340a,b adapted to implement intra-cluster communication among the modules, including D-module-to-D-module communication.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340a on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340b on D-module 350 de-encapsulates the CF message and processes the file system command.

Figure 4:
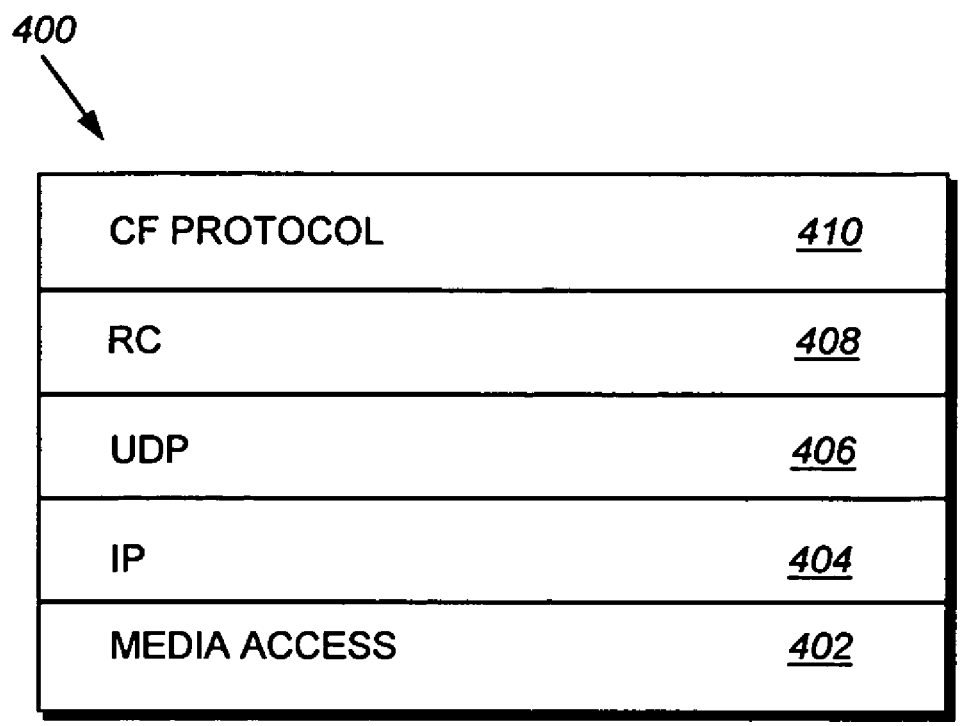
FIG. 4 is a schematic block diagram illustrating the format of a cluster fabric (CF) message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

Figure 5:
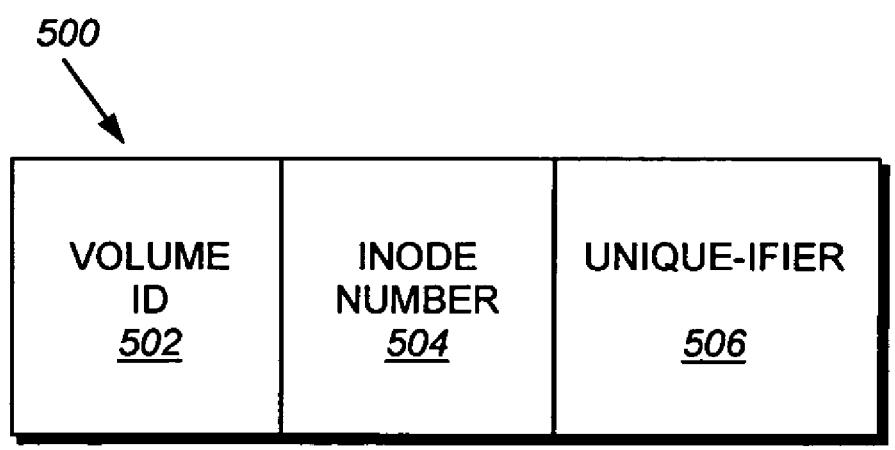
FIG. 5 is a schematic block diagram illustrating the format of a data container handle in accordance with an embodiment of the present invention.

A data container, e.g., a file, is accessed in the file system using a data container handle. FIG. 5 is a schematic block diagram illustrating the format of a data container handle 500 including a volume ID field 502, an inode number field 504 and a unique-ifier field 506. The volume ID field 502 contains a global identifier (within the cluster 100) of the volume within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields.

E. File System Organization

Figure 6:
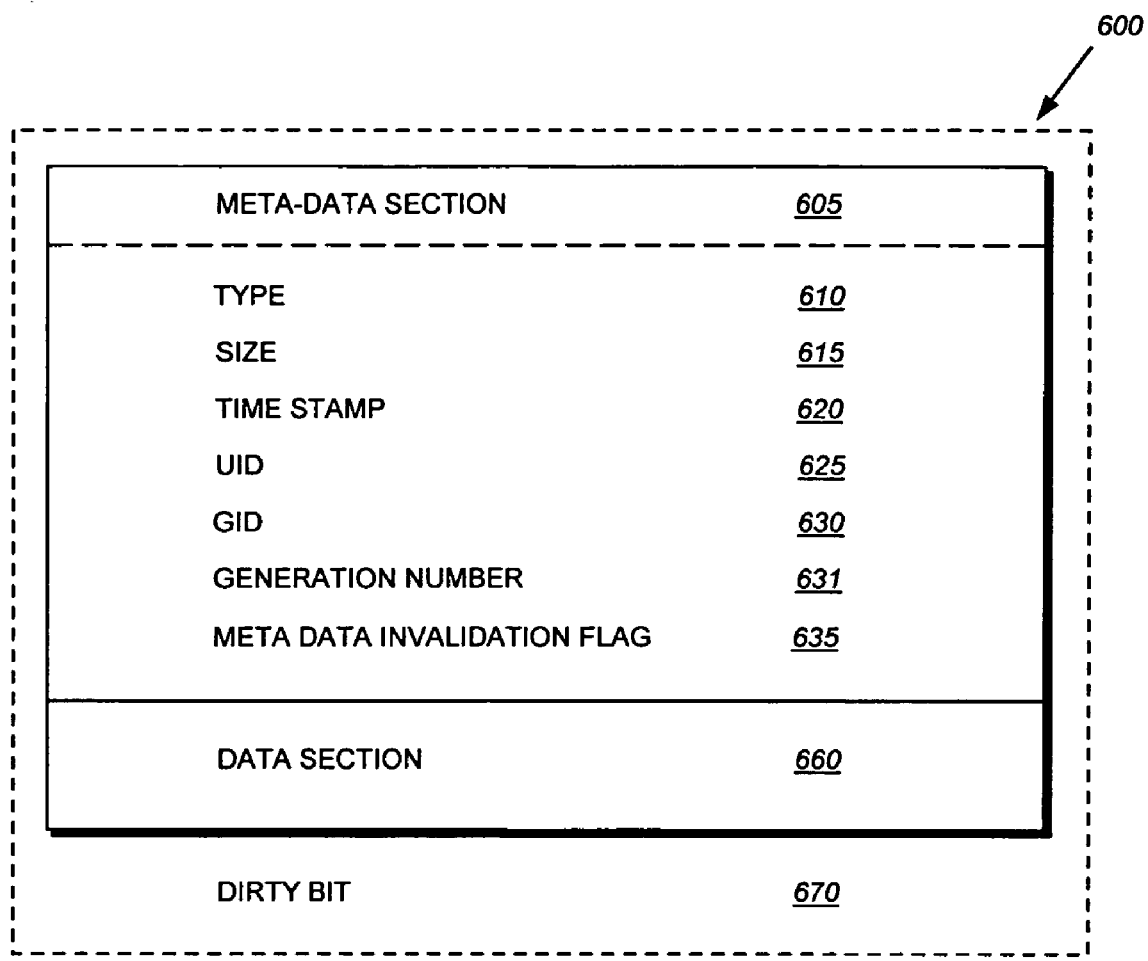
FIG. 6 is a schematic block diagram of an exemplary inode in accordance with an embodiment of the present invention.

In the illustrative embodiment, a data container is represented in the write-anywhere file system as an inode data structure adapted for storage on the disks 130. FIG. 6 is a schematic block diagram of an inode 600, which preferably includes a meta-data section 605 and a data section 660. The information stored in the meta-data section 605 of each inode 600 describes the data container (e.g., a file) and, as such, includes the type (e.g., regular, directory, vdisk) 610 of file, its size 615, time stamps (e.g., access and/or modification time) 620 and ownership, i.e., user identifier (UID 625) and group ID (GID 630), of the file. The meta-data section 605 also includes a generation number 631, and a meta-data invalidation flag field 635. The meta-data invalidation flag field 635 is used to indicate whether meta-data in the inode is usable. The contents of the data section 660 of each inode may be interpreted differently depending upon the type of file (inode) defined within the type field 610. For example, the data section 660 of a directory inode contains meta-data controlled by the file system, whereas the data section of a regular inode contains file system data. In this latter case, the data section 660 includes a representation of the data associated with the file.

Specifically, the data section 660 of a regular on-disk inode may include file system data or pointers, the latter referencing 4 KB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section 660 of the inode (e.g., a second level inode) references an indirect block (e.g., a first level L1 block) that contains 1024 pointers, each of which references a 4 KB data block on disk. For file system data having a size greater than 64 MB, each pointer in the data section 660 of the inode (e.g., a third level L3 inode) references a double-indirect block (e.g., a second level L2 block) that contains 1024 pointers, each referencing an indirect (e.g., a first level L1) block. The indirect block, in turn, contains 1024 pointers, each of which references a 4 KB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk. The in-core and on-disk format structures of the WAFL file system, including the inodes and inode file, are disclosed and described in the previously incorporated U.S. Pat. No. 5,819,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1998.

Figure 7:
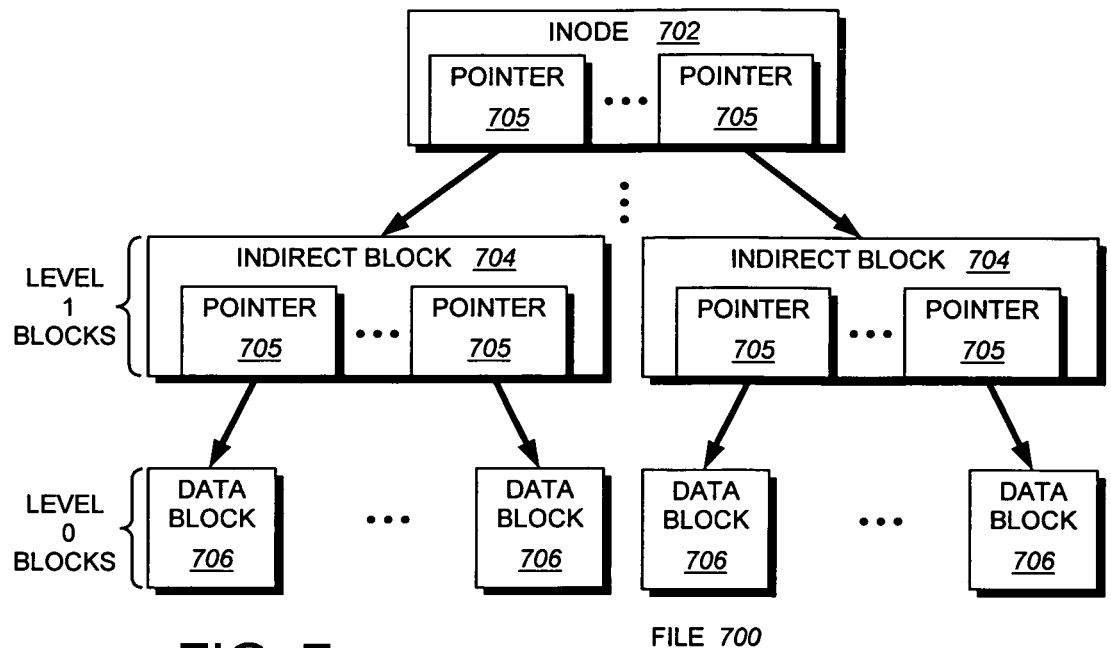
FIG. 7 is a schematic block diagram of an exemplary buffer tree in accordance with an embodiment of the present invention.

FIG. 7 is a schematic block diagram of an embodiment of a buffer tree of a file that may be advantageously used with the present invention. The buffer tree is an internal representation of blocks for a file (e.g., file 700) loaded into the memory 224 and maintained by the write-anywhere file system 360. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pointers 705 that ultimately reference data blocks 706 used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volume) of a storage system, such as node 200. An example of such a file system layout is described in U.S. patent application Ser. No. 10/836,817 titled EXTENSION OF WRITE ANYWHERE FILE SYSTEM LAYOUT, by John K. Edwards et al. and assigned to Network Appliance, Inc. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Moreover, each flexible volume comprises data blocks and indirect blocks that contain block pointers that point at either other indirect blocks or data blocks.

In one embodiment, pvbns are used as block pointers within buffer trees of files (such as file 700) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 8:
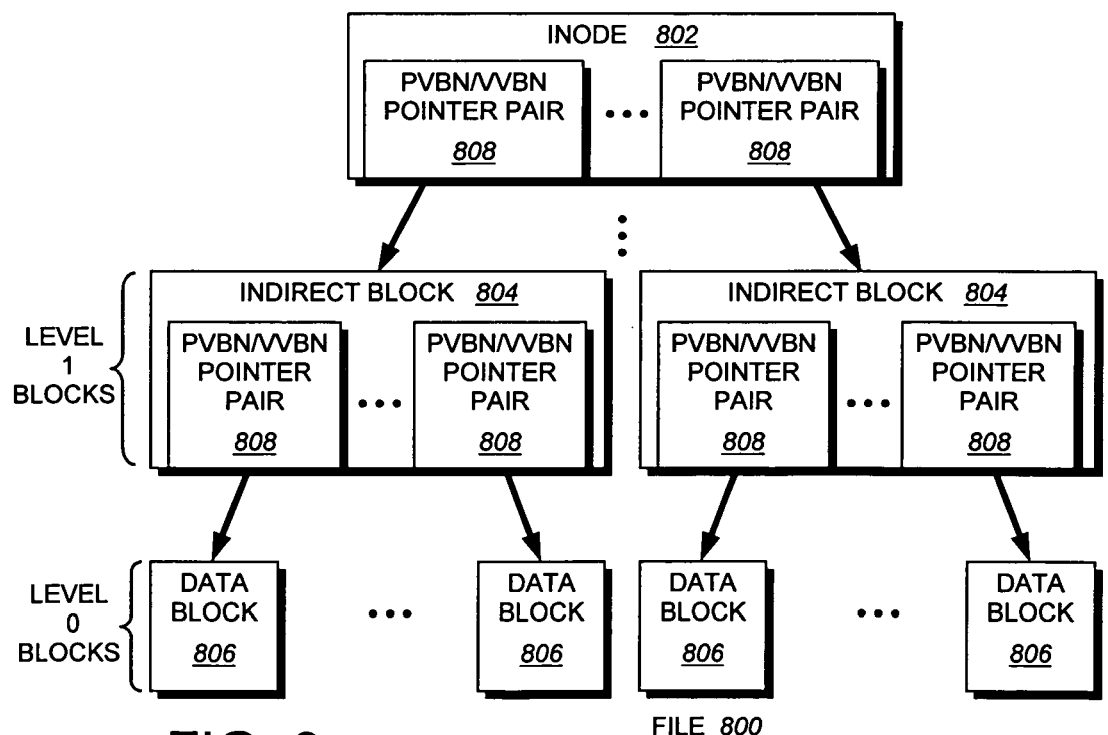
FIG. 8 is a schematic block diagram of an illustrative embodiment of a buffer tree of a file that may be advantageously used with the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks. FIG. 8 is a schematic block diagram of an illustrative embodiment of a buffer tree of a file 800 that may be advantageously used with the present invention. A root (top-level) inode 802, such as an embedded inode, references indirect (e.g., level 1) blocks 804. Note that there may be additional levels of indirect blocks (e.g., level 2, level 3) depending upon the size of the file. The indirect blocks (and inode) contain pvbn/vvbn pointer pair structures 808 that ultimately reference data blocks 806 used to store the actual data of the file.

The pvbns reference locations on disks of the aggregate, whereas the vvbns reference locations within files of the flexible volume. The use of pvbns as block pointers 808 in the indirect blocks 804 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 9:
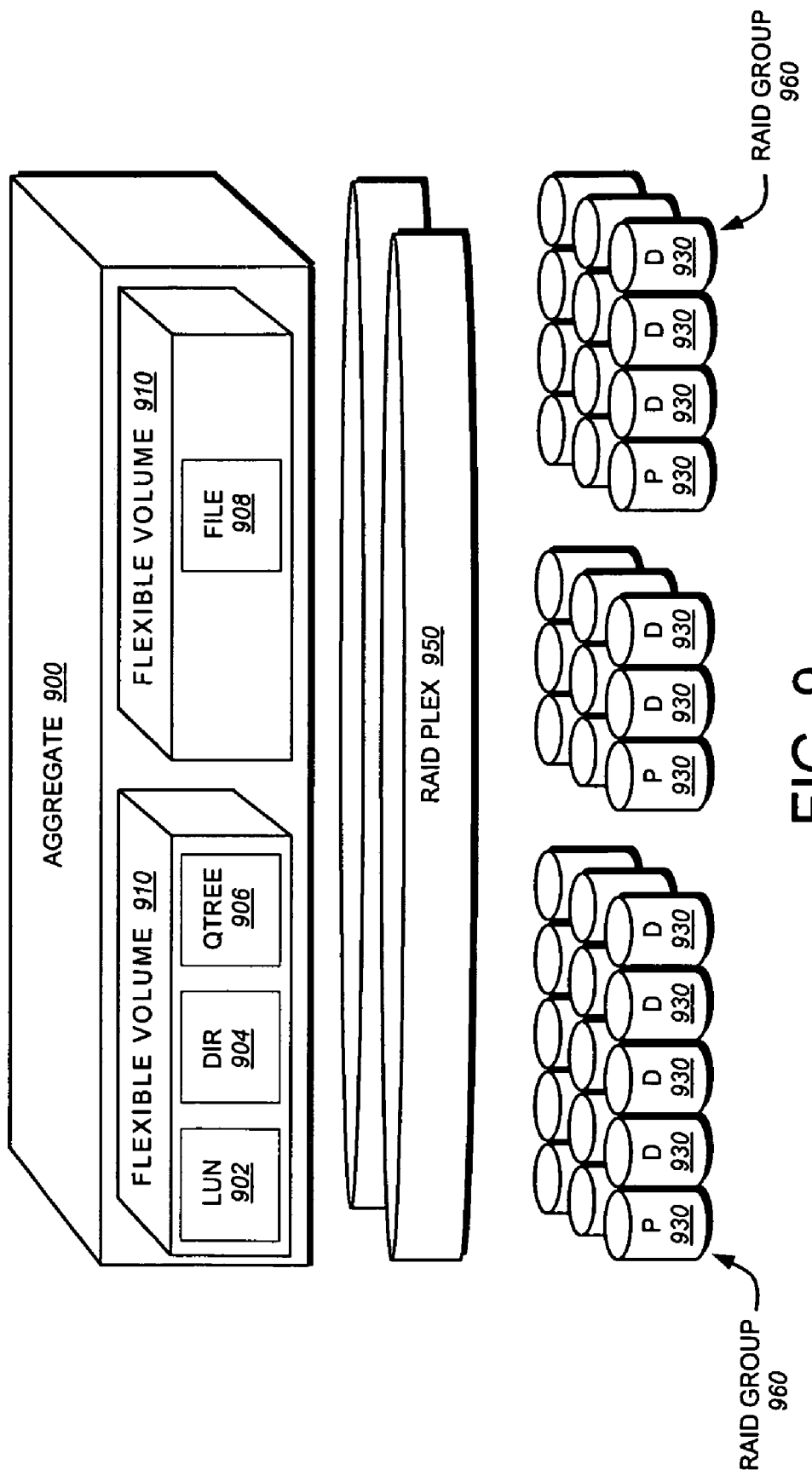
FIG. 9 is a schematic block diagram of an exemplary aggregate in accordance with an embodiment of the present invention.

FIG. 9 is a schematic block diagram of an embodiment of an aggregate 900 that may be advantageously used with the present invention. Luns (blocks) 902, directories 904, qtrees 906 and files 908 may be contained within flexible volumes 910, such as dual vbn flexible volumes, that, in turn, are contained within the aggregate 900. The aggregate 900 is illustratively layered on top of the RAID system, which is represented by at least one RAID plex 950 (depending upon whether the storage configuration is mirrored), wherein each plex 950 comprises at least one RAID group 960. Each RAID group further comprises a plurality of disks 930, e.g., one or more data (D) disks and at least one (P) parity disk.

Whereas the aggregate 900 is analogous to a physical volume of a conventional storage system, a flexible volume is analogous to a file within that physical volume. That is, the aggregate 900 may include one or more files, wherein each file contains a flexible volume 910 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 910 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 KB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 10:
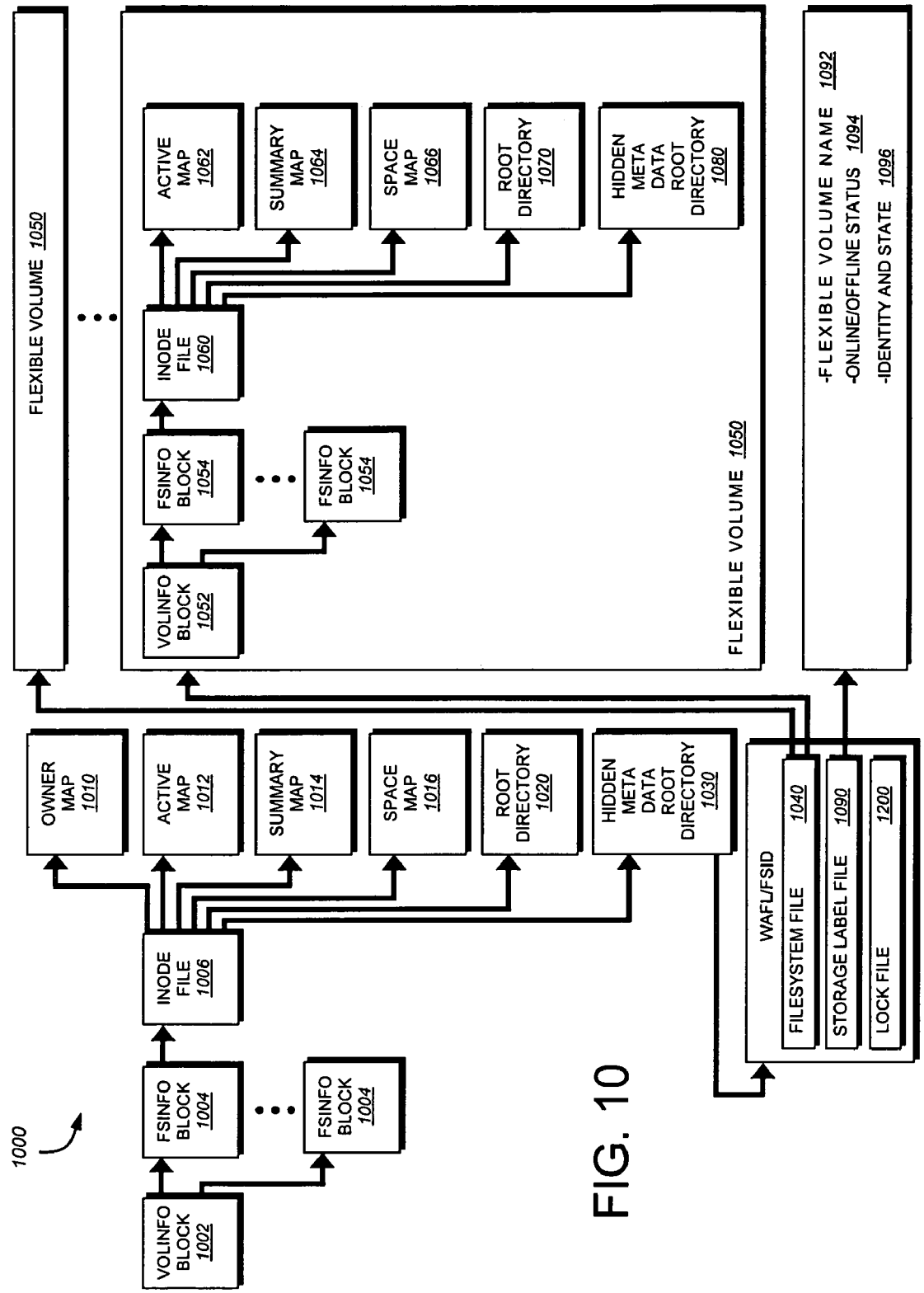
FIG. 10 is a schematic block diagram of an exemplary on-disk layout of an aggregate in accordance with an embodiment of the present invention.

FIG. 10 is a schematic block diagram of an on-disk representation of an aggregate 1000. The storage operating system 300, e.g., the RAID system 380, assembles a physical volume of pvbns to create the aggregate 1000, with pvbns 1 and 2 comprising a "physical" volinfo block 1002 for the aggregate. The volinfo block 1002 contains block pointers to fsinfo blocks 1004, each of which may represent a snapshot of the aggregate. Each fsinfo block 1004 includes a block pointer to an inode file 1006 that contains inodes of a plurality of files, including an owner map 1010, an active map 1012, a summary map 1014 and a space map 1016, as well as other special meta-data files. The inode file 1006 further includes a root directory 1020 and a "hidden" meta-data root directory 1030, the latter of which includes a namespace having files related to a flexible volume in which users cannot "see" the files. The hidden meta-data root directory includes the WAFL/fsid/directory structure that contains filesystem file 1040 and storage label file 1090. Note that root directory 1020 in the aggregate is empty; all files related to the aggregate are organized within the hidden meta-data root directory 1030.

In addition to being embodied as a container file having level 1 blocks organized as a container map, the filesystem file 1040 includes block pointers that reference various file systems embodied as flexible volumes 1050. The aggregate 1000 maintains these flexible volumes 1050 at special reserved inode numbers. Each flexible volume 1050 also has special reserved inode numbers within its flexible volume space that are used for, among other things, the block allocation bitmap structures. As noted, the block allocation bitmap structures, e.g., active map 1062, summary map 1064 and space map 1066, are located in each flexible volume.

Specifically, each flexible volume 1050 has the same inode file structure/content as the aggregate, with the exception that there is no owner map and no WAFL/fsid/filesystem file, storage label file directory structure in a hidden meta-data root directory 1080. To that end, each flexible volume 1050 has a volinfo block 1052 that points to one or more fsinfo blocks 1054, each of which may represent a snapshot, along with the active file system of the flexible volume. Each fsinfo block, in turn, points to an inode file 1060 that, as noted, has the same inode structure/content as the aggregate with the exceptions noted above. Each flexible volume 1050 has its own inode file 1060 and distinct inode space with corresponding inode numbers, as well as its own root (fsid) directory 1070 and subdirectories of files that can be exported separately from other flexible volumes.

The storage label file 1090 contained within the hidden meta-data root directory 1030 of the aggregate is a small file that functions as an analog to a conventional raid label. A raid label includes physical information about the storage system, such as the volume name; that information is loaded into the storage label file 1090. Illustratively, the storage label file 1090 includes the name 1092 of the associated flexible volume 1050, the online/offline status 1094 of the flexible volume, and other identity and state information 1096 of the associated flexible volume (whether it is in the process of being created or destroyed).

F. VLDB

Figure 11:
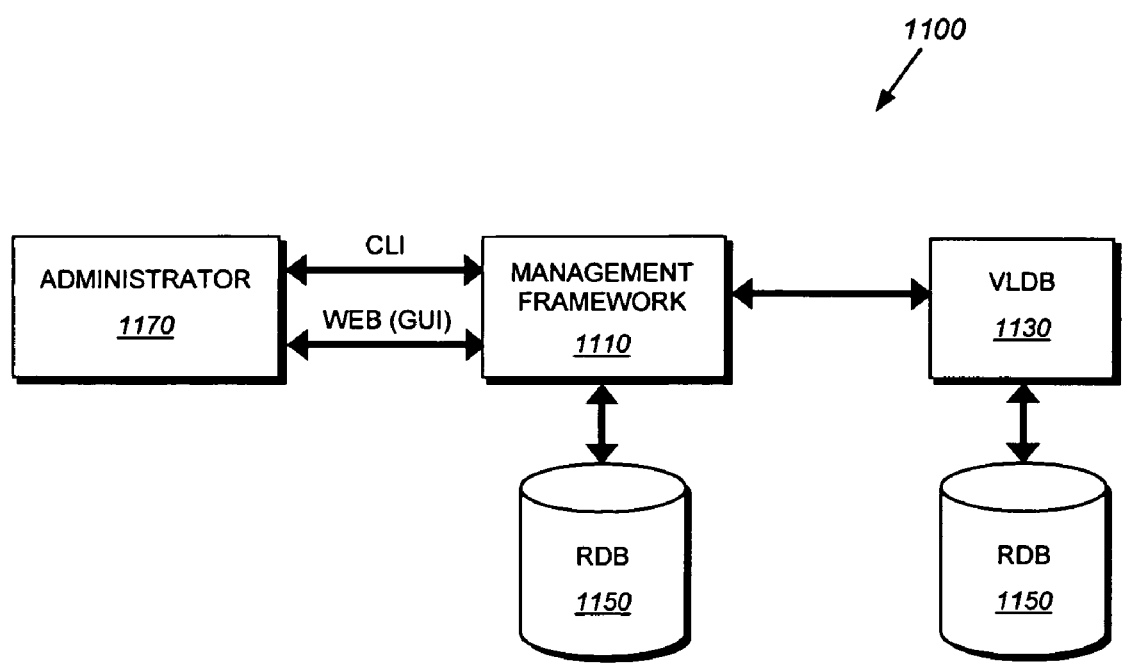
FIG. 11 is a schematic block diagram illustrating a collection of management processes in accordance with an embodiment of the present invention.

FIG. 11 is a schematic block diagram illustrating a collection of management processes that execute as user mode applications 1100 on the storage operating system 300 to provide management of configuration information (i.e. management data) for the nodes of the cluster. To that end, the management processes include a management framework process 1110 and a volume location database (VLDB) process 1130, each utilizing a data replication service (RDB 1150) linked as a library. The management framework 1110 provides a user to an administrator 1170 interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 1130 is a database process that tracks the locations of various storage components (e.g., flexible volumes, aggregates, etc.) within the cluster 100 to thereby facilitate routing of requests throughout the cluster. In the illustrative embodiment, the N-module 310 of each node accesses a configuration table 235 that maps the volume ID 502 of a data container handle 500 to a D-module 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 910") and aggregates 900 within the cluster.

G. Persistent Storage of Lock State Information

The present invention is directed to a system and method for persistently storing lock state information of a file system within a storage system. To that end, a storage operating system executing on the storage system generates entries identifying lock state information within a NVLog that is illustratively stored within a NVRAM of the storage system. At regular intervals, the entries within the NVLog are flushed (written) to a lock file stored on persistent storage devices, such as disks 130, coupled to the storage system. Illustratively, the lock state information entries are written to the lock file so that any storage system capable of accessing the storage devices may obtain the lock state information. Persistent storage of the lock state information obviates the need for clients to reestablish locks after an error condition as the storage system may, during a reinitialization process, determine the lock state of the file system as of the time of the error condition. Additionally, lock state information and its associated data may be migrated to other storage systems by transferring the lock file in accordance with, e.g., a file system migration operation. Similarly, the lock state information may be propagated via conventional mirroring techniques by including the lock file within a mirrored file system. In the illustrative embodiment, care should be taken to ensure that when mirroring operations are performed for load balancing purposes, instead of disaster recover purposes, lock state information should not be mirrored.

Figure 12:
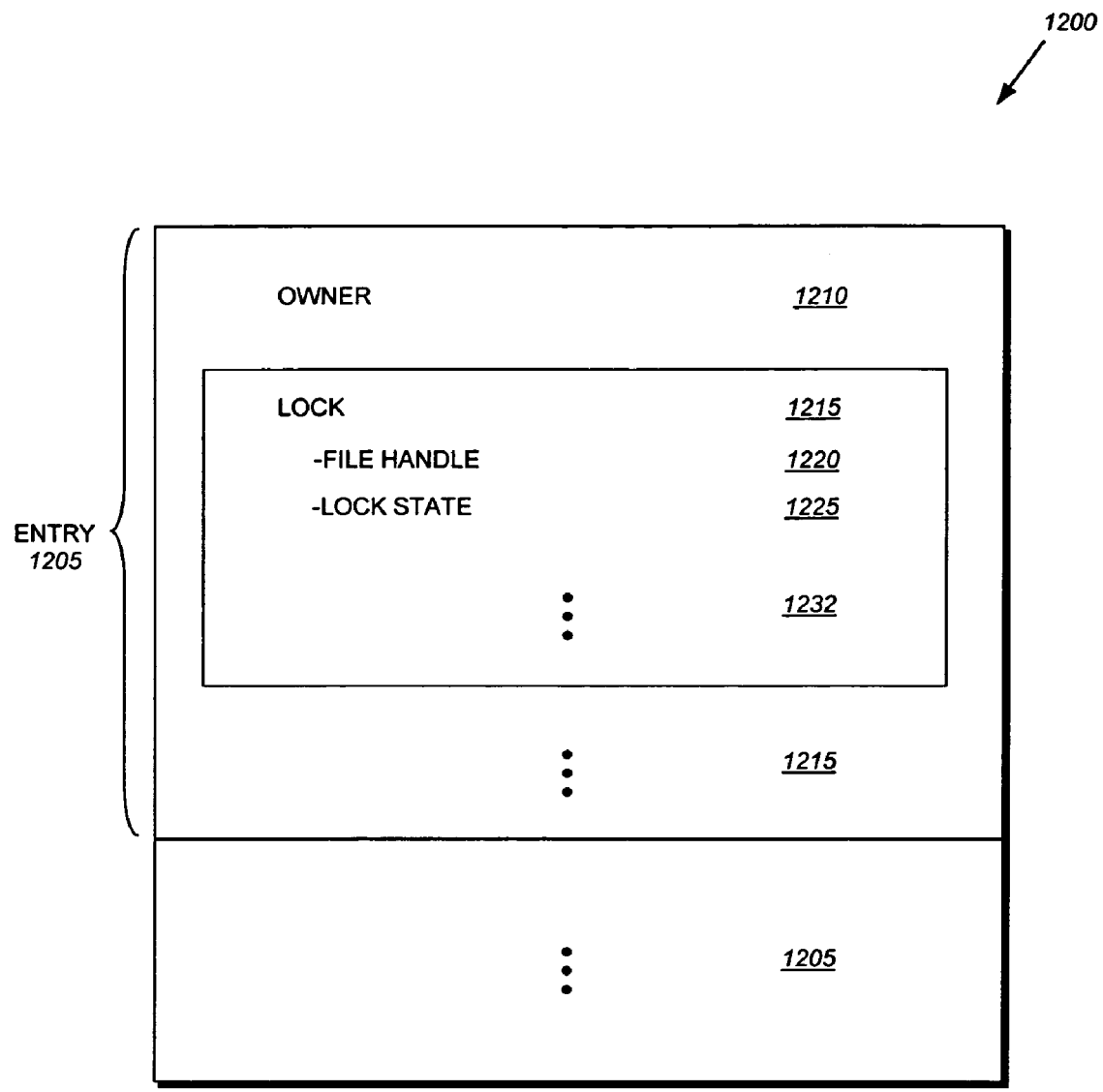
FIG. 12 is a schematic block diagram of an exemplary lock file in accordance with an embodiment of the present invention.

FIG. 12 is a schematic block diagram of an exemplary lock file 1200 in accordance with an embodiment of the present invention. The lock file 1200 illustratively comprises a plurality of entries 1205. Each entry 1205 contains an owner field 1210 and one or more lock fields 1215, i.e., each entry is associated with a single owner of one or more locks in the file system. Each lock field 1215 illustratively comprises a file handle field 1220, a lock state field 1225 and in alternate embodiments, additional fields 1225. The file handle field 1220 contains a file handle identifying the file with which the lock is associated. The lock state field 1225 identifies the current state of the lock including, e.g., type, range, etc.

Figure 13:
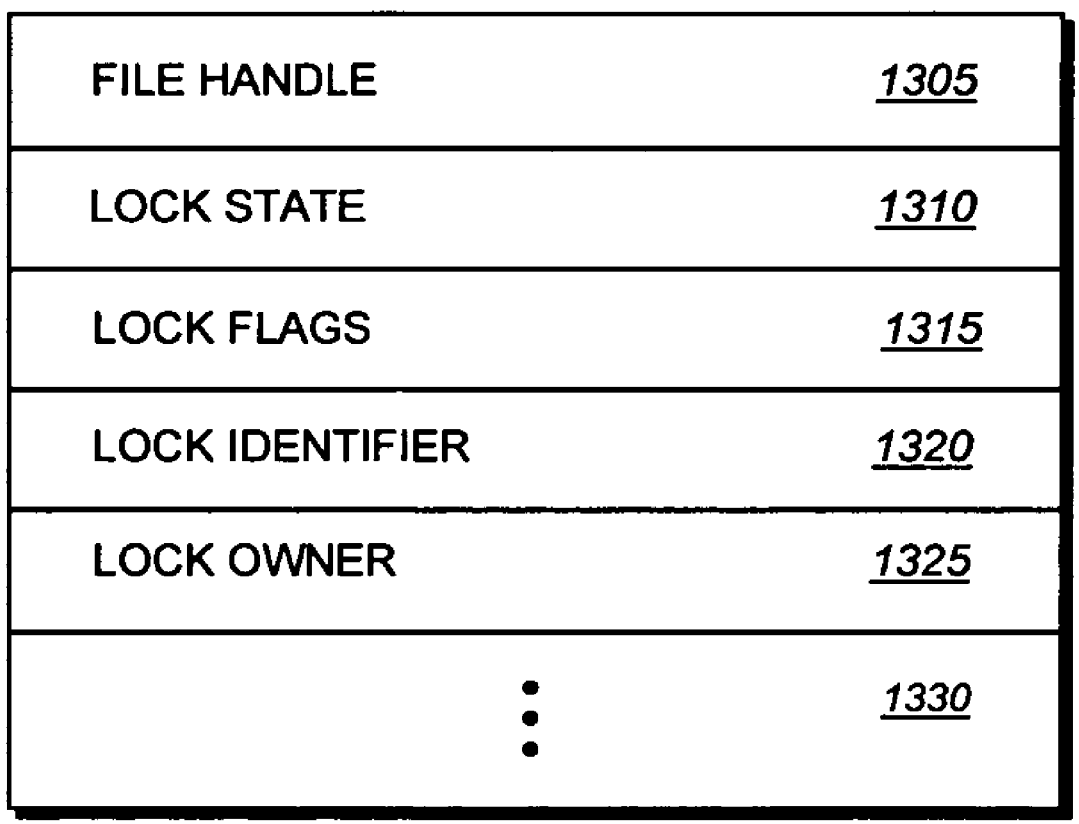
FIG. 13 is a schematic block diagram of an exemplary non-volatile log (NVLog) entry for a lock modification operation in accordance with an embodiment of the present invention.

FIG. 13 is a schematic block diagram of an exemplary NVLog entry 1300 associated with a lock in accordance with an embodiment of the present invention. The NVLog entry 1300 illustratively includes a file handle field 1305, a lock state field 1310, a lock flags field 1315, a lock identifier field 1320, a lock owner field 1325 and, in alternate embodiments, additional fields 1330. The file handle field 1305 contains a file handle identifying the file associated with this lock. The lock state field 1310 identifies the current state of the lock (i.e., lock state) for example, whether the lock has been granted or whether the lock is currently waiting to be granted. The lock flags field 1315, contains flags associated with the lock. Such flags may identify the lock as a soft lock, an exclusive lock, etc. The lock identifier field 1320 contains an identifier of the lock for use in other file system operations. The lock owner field 1325 contains information identifying the owner of the lock including, e.g., an owner identifier and a host identifier that identifies the owner/host that owns the lock.

Figure 14:
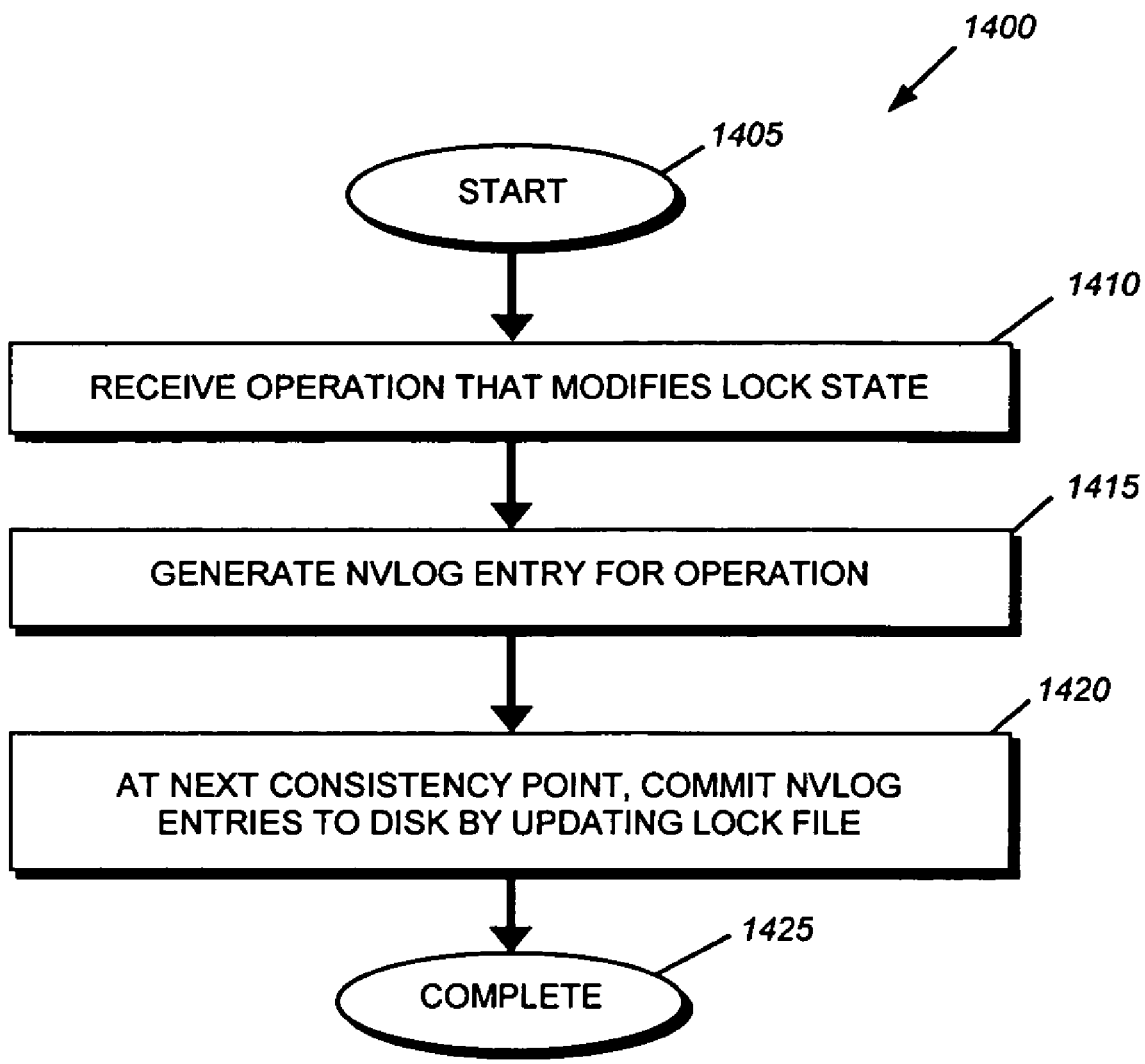
FIG. 14 is a flowchart detailing the steps of a procedure for receiving and updating lock information in a persistent manner in accordance with an embodiment of the present invention.

FIG. 14 is a flowchart detailing the steps of a procedure 1400 for persistently storing lock state information in accordance with an illustrative embodiment of the present invention. The procedure 1400 begins in step 1405 and continues to step 1410 where a storage system receives an operation that modifies the lock state. Such an operation may include, for example, a create lock command, a delete lock command, or particular commands that may implicitly modify lock state information. In response, an NVLog entry 1300 for the operation is generated in step 1415. Illustratively, this NVLog entry 1300 is generated by the file system after receiving the command from the particular protocol server e.g., the NFS server 320. However, in alternate embodiments, the protocol server may directly generate an NVLog entry. The NVLog entry is stored within the NVRAM 229 of the storage system and is thus persistently stored. Should the storage system fail, the NVLog may be replayed during a reinitialization procedure (see procedure 1500) to to recover the current state, including the lock state, of the file system. At a next CP, the NVLog entries are committed to disk by updating the lock file stored on, e.g., an aggregate. Illustratively, during the CP, the file system concatenates the various NVLog entries e.g., on an owner basis, to generate appropriate new entries for the lock file 1200. The procedure then completes in step 1425.

Figure 15:
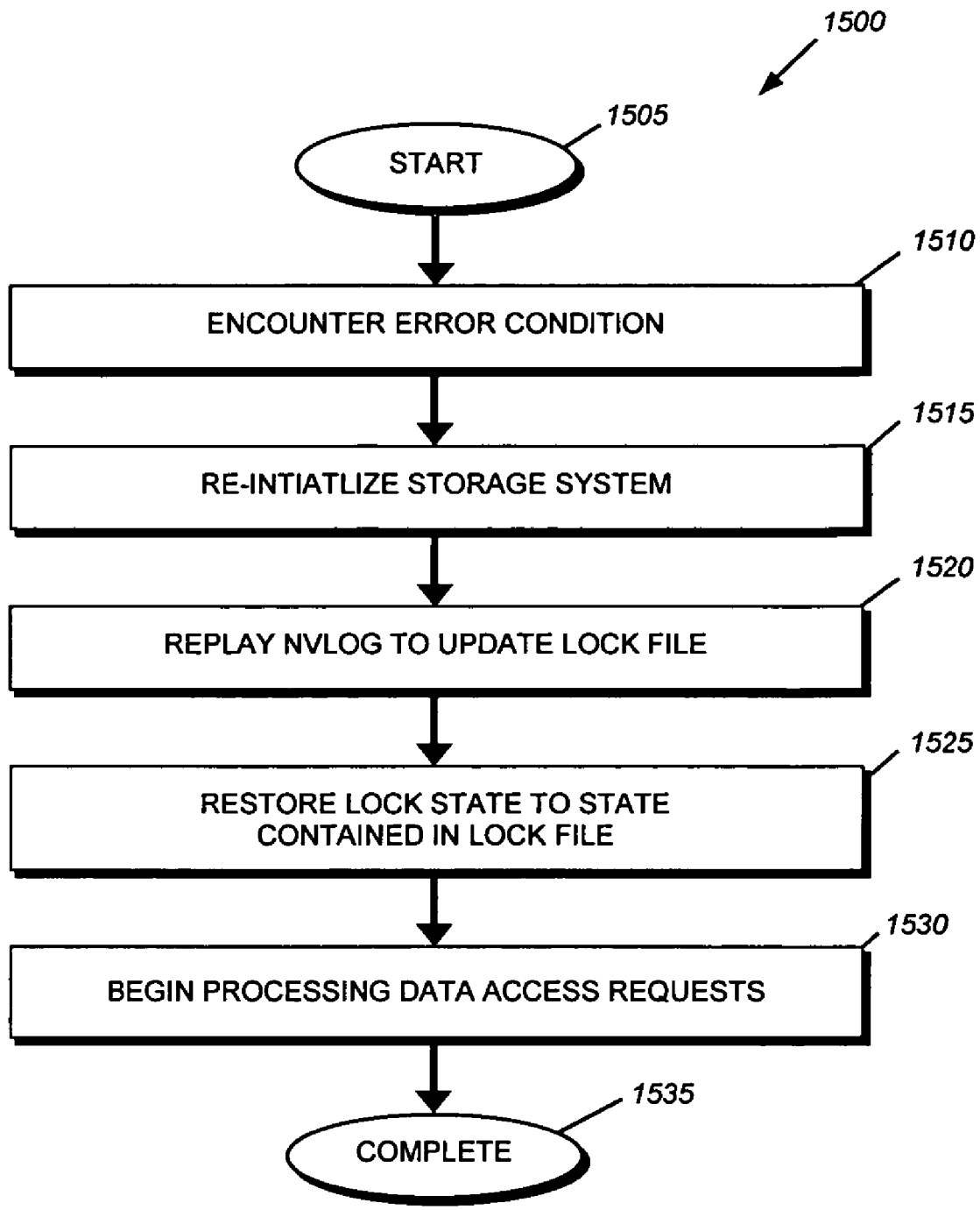
FIG. 15 is a flowchart detailing the steps of a procedure for recovering from an error condition in accordance with an embodiment of the present invention.

FIG. 15 is a flowchart detailing the steps of a procedure 1500 for recovering lock state information in the event of an error condition. The procedure 1500 begins in step 1505 and continues to step 1510 where the storage system encounters an error condition. Such an error condition may include, for example, a loss of power, a failure of one or more modules of the storage operating system, etc. In response to the error condition, the storage system re-initializes in step 1515. This reinitialization may be initiated by a user by, for example, a power cycle of the storage system, or may be the result of the storage operating system itself re-initializing in response to detection of the error condition. During the reinitialization process, in step 1520, the file system "replays" (i.e., processes operations in) the NVLog to update the lock file. It should be noted that during replay of the NVLog, lock file entries are also replayed to bring the state of the file system to a consistent state. Once the NVLog has been replayed, the file system, in step 1525, restores its lock state to the state contained within the lock file on the aggregate. This may be accomplished by, for example, reading the lock file and generating an in-core representation of the lock state contained in the lock file. At the point in time of completion of step 1525, the file system's lock state is fully represented within the lock file. Once the lock state has been restored, the storage system, in step 1530, begins processing data access requests before the procedure completes in step 1535.

It should be noted that should the error condition corrupt the lock state file, the present invention may not be utilized and a conventional lock recovery technique must be utilized to recover the lock state. Furthermore, it should be noted that if the filesystem undergoes a traumatic event, wherein the contents of the filesystem change from under client control, the lock state file should be deleted and a conventional lock recovery operation be performed. An example of a traumatic event should be restoring a file system from a persistent consistency point image, such as that described in U.S. Pat. No. 5,819,292 entitled METHOD FOR MAINTAINING CONSISTENT STATES OF A FILE SYSTEM AND FOR CREATING USER-ACCESSIBLE READ-ONLY COPIES OF A FILE SYSTEM, by David Hitz, et al.

The foregoing description has been directed to particular embodiments of this invention. It will be apparent, however, that other variations and modifications may be made to the described embodiments, with the attainment of some or all of their advantages. Specifically, it should be noted that the principles of the present invention may be implemented in non-distributed file systems. Furthermore, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A method for persistently storing lock state information associated with a file system comprising:
    receiving, at any node in a cluster, an operation configured to modify lock state information of the file system, the lock state information associated with at least one lock enabled by a client, the lock preventing modification of a file by another client in the cluster while the lock is in place;
    generating an entry within a non-volatile log, the entry representative of a modified lock state information;
    storing the modified lock state information within the non-volatile log entry, the non-volatile log stored within a non-volatile random access memory; and
    updating, during a consistency point associated with the file system, a lock file stored on a persistent storage device with the modified lock state information of the non-volatile log entry, the persistent storage of the modified lock state information eliminating the need to reestablish the lock on a file after an error condition has occurred, wherein updating the lock file with the modified lock state information of the non-volatile log entry further comprises concatenating, on an owner basis, one or more non-volatile log entries to generate new entries for the lock file.

2. The method of claim 1 further comprising storing the lock file within a metadata directory of the file system.

3. The method of claim 1 further comprising, in response to an error condition, replaying one or more entries from the non-volatile log to update the lock file.

4. The method of claim 1 wherein the received operation that modifies the lock state comprises a create lock operation.

5. A system configured to persistently store lock state information associated with a file comprising:
    a storage system organized as any node in a cluster, the storage system executing a storage operating system configured to implement the file system;
    a non-volatile random access memory of the storage system, the non-volatile random access memory storing a non-volatile log; and
    wherein the storage operating system is further configured to, in response to receiving an operation to modify the lock state information: (i) generate an entry within the non-volatile log for the received operation; (ii) store modified lock state information within the non-volatile log entry; and (iii) update, during a consistency point associated with the file system, a lock file with the modified lock state information of the non-volatile log entry, wherein update the lock file with the modified lock state information of the non-volatile log entry further comprises concatenating, on an owner basis, one or more non-volatile log entries to generate new entries for the lock file.

6. The system of claim 5 wherein the lock file is stored within a metadata directory of the file system.

7. The system of claim 5 wherein the entry in the non volatile log comprises:
    a file handle field;
    a lock state field; and
    a lock owner field.

8. The system of claim 5 wherein the storage operating system is further configured to, in response to an error condition, replay one or more of the entries from the non-volatile log to update the lock file.

9. A system configured to persistently store lock state information associated with a file system comprising:
    means for receiving, at any node in a cluster, an operation configured to modify lock state information of the file system, the lock state information associated with at least one lock enabled by a client, the lock preventing modification of a file by another client in the cluster;
    means for generating an entry within a non-volatile log, the entry representative of a modified lock state-information;
    means for storing the modified lock state information within the non-volatile log entry, the non-volatile log stored within a non-volatile random access memory; and
    means for updating, during a consistency point associated with the file system, a lock file stored on a persistent storage device with the modified lock state information of the non-volatile log entry, wherein updating the lock file with the modified lock state information of the non-volatile log entry further comprises concatenating, on an owner basis, one or more non-volatile log entries to generate new entries for the lock file, the persistent storage of the modified lock state information eliminating the need to reestablish the lock on a file after an error condition has occurred.

10. The system of claim 9 wherein the lock file is stored within a metadata directory of the file system.

11. The system of claim 9 further comprising, in response to an error condition, means for replaying one or more entries from the non-volatile log to update the lock file.

12. The system of claim 9 wherein the entry in the non-volatile log comprises:
    a file handle field;
    a lock state field; and
    a lock owner field.

13. A computer readable medium containing executable program instructions executed by a processor, comprising:
    program instructions that receive, at any node in a cluster, an operation configured to modify lock state information of the file system, the lock state information associated with at least one lock enabled by a client, the lock preventing modification of a file by another client in the cluster;
    program instructions that generate an entry within a non-volatile log, the entry representative of a modified lock state information;
    program instructions that store the modified lock state information within the non-volatile log entry, the non-volatile log stored within a non-volatile random access memory; and
    program instructions that update, during a consistency point associated with the file system, a lock file with the modified lock state information of the non-volatile log entry, wherein update the lock file with the modified lock state information of the non-volatile log entry further comprises concatenating, on an owner basis, one or more non-volatile log entries to generate new entries for the lock file, the persistent storage of the modified lock state information eliminating the need to reestablish the lock on a file after an error condition has occurred.

14. The computer readable medium of claim 13 wherein the non-volatile log entry comprises:
   a file handle field;
   a lock state field; and
   a lock owner field.

15. The method of claim 1 wherein the modified lock state information of the lock file is accessible to each of a plurality of nodes in the cluster.

16. The system of claim 5 wherein the modified lock state information of the lock file is accessible to each of a plurality of nodes in the cluster.

17. A method for persistently storing lock state information associated with a file system, comprising:
   receiving at a storage system an operation configured to modify lock state information of a lock file, the lock file previously stored on a persistent storage device;
   generating by a file system an entry within a non-volatile log, the entry representative of a modified lock state information;
   storing the modified lock state information within the non-volatile log entry, the non-volatile log stored within a non-volatile random access memory;
   updating, during a consistency point, by writing the entries stored on the non-volatile log to the lock file stored on the persistent storage device, wherein update the lock file with the modified lock state information of the non-volatile log entry further comprises concatenating, on an owner basis, one or more non-volatile log entries to generate new entries for the lock file, the entries written to the lock file so that any storage system in the cluster capable of accessing the storage devices may obtain the modified lock state information;
   encountering an error condition on a storage system, the storage system associated with the lock file contained on the persistent storage device; and
   reinitializing storage system and restoring, by the file system, the lock state to the state contained within the lock file on the persistent storage device.

18. The method of claim 17 wherein the operation is a particular command that implicitly modifies the lock state information.

19. A method for persistently storing lock state information associated with a file system comprising:
   receiving, at any node in a cluster, an operation configured to modify lock state information of the file system, the lock state information associated with at least one lock enabled by a client, the lock preventing modification of a file by another client in the cluster while the lock is in place;
   generating an entry within a non-volatile log, the entry representative of a modified lock state information;
   storing the modified lock state information within the non-volatile log entry, the non-volatile log stored within a battery-backed memory; and
   updating, during a consistency point associated with the file system, a lock file stored on a disk with the modified lock state information of the non-volatile log entry, wherein update the lock file with the modified lock state information of the non-volatile log entry further comprises concatenating, on an owner basis, one or more non-volatile log entries to generate new entries for the lock file, the disk of the modified lock state information eliminating the need to reestablish the lock on a file after an error condition has occurred.

20. The method of claim 19 wherein the battery backed memory is a non-volatile random access memory (NVRAM).

* * * * *